(12) United States Patent
Tanno et al.

(10) Patent No.: US 7,571,437 B2
(45) Date of Patent: Aug. 4, 2009

(54) METHOD AND SYSTEM FOR DETECTING OMISSION IN SOFTWARE-PROPERTY MANAGEMENT USING NETWORK

(75) Inventors: Hidekazu Tanno, Tokyo (JP); Yoshinaga Seki, Tokyo (JP); Shinji Hasei, Osaka (JP)

(73) Assignee: NEC Corporation, Tokyo (JP)

( * ) Notice: Subject to any disclaimer, the term of this patent is extended or adjusted under 35 U.S.C. 154(b) by 978 days.

(21) Appl. No.: 10/720,211

(22) Filed: Nov. 25, 2003

(65) Prior Publication Data

US 2004/0117767 A1 Jun. 17, 2004

(30) Foreign Application Priority Data

Nov. 26, 2002 (JP) ............................. 2002-342735

(51) Int. Cl.
G06F 9/445 (2006.01)
G06F 15/177 (2006.01)

(52) U.S. Cl. ................... 717/172; 717/176; 709/220; 709/221

(58) Field of Classification Search ......... 717/168–178, 717/136; 709/221–224, 218; 707/10
See application file for complete search history.

(56) References Cited

U.S. PATENT DOCUMENTS

| | | | |
|---|---|---|---|
| 6,425,126 B1* | 7/2002 | Branson et al. ............ 717/168 |
| 6,584,501 B1* | 6/2003 | Cartsonis et al. ........... 709/224 |
| 6,633,909 B1* | 10/2003 | Barrett et al. .............. 709/224 |
| 6,678,726 B1* | 1/2004 | Moshaiov .................. 709/221 |
| 7,181,731 B2* | 2/2007 | Pace et al. ................. 717/136 |
| 2002/0174422 A1* | 11/2002 | Kelley et al. ............... 717/178 |
| 2003/0046363 A1* | 3/2003 | Ezato ........................ 709/218 |
| 2003/0055951 A1* | 3/2003 | Chemali .................... 709/224 |
| 2003/0135613 A1* | 7/2003 | Yoshida et al. ............. 709/224 |
| 2004/0040023 A1* | 2/2004 | Ellis et al. .................. 717/178 |

(Continued)

FOREIGN PATENT DOCUMENTS

JP 08-137768 A 5/1996

(Continued)

OTHER PUBLICATIONS

"SafePatch—Version 0.9—User Manual", Mar. 1999. Online retrieved at <www.osti.gov/bridge/product.biblio.jsp?osti_id=9824>.*

(Continued)

*Primary Examiner*—Tuan Q Dam
*Assistant Examiner*—Thuy Dao
(74) *Attorney, Agent, or Firm*—Sughrue Mion, PLLC

(57) ABSTRACT

To prevent a computer to be managed from being omitted in software-property management which manages, for each computer, basic information thereof, installed software, and fix-patch application status, an omission-in-software-property-management detection method using a network is provided. A network-connected-computer list which holds, for all computers connected to a given network, information for identifying each computer, and a software-property management list which holds, for all computers to be managed by the software-property management, information for identifying each computer, are used as a basis on which a computer is extracted that is present in the network-connected-computer list and absent in the software-property management list. And a list is created of a computer omitted in software property management.

14 Claims, 10 Drawing Sheets

U.S. PATENT DOCUMENTS

2006/0059166 A1* 3/2006 Sieffert et al. .................. 707/10

FOREIGN PATENT DOCUMENTS

| JP | 08-181712 A | 7/1996 |
|---|---|---|
| JP | 10-40098 A | 2/1998 |
| JP | 11-24918 A | 1/1999 |
| JP | 11-27285 A | 1/1999 |
| JP | 11-296453 A | 10/1999 |
| JP | 2000-250743 A | 9/2000 |
| JP | 2001-222424 A | 8/2001 |
| JP | 2001-290937 A | 10/2001 |
| JP | 2001-306303 A | 11/2001 |
| JP | 2002-55839 A | 2/2002 |
| JP | 2002-268764 A | 9/2002 |
| JP | 2002-279165 A | 9/2002 |

OTHER PUBLICATIONS

"Solaris Patch Management: Recommended Strategies", Sun Microsystems, Oct. 2002, pp. 1-34. Online retrieved at <http://www.filibeto.org/~aduritz/misc/pmstrategies10.02.pdf>.*

"Patch Management Proposal", Schuur et al., Sep. 2001, pp. 1-6. Online retrieved at <http://sblim.wiki.sourceforge.net/space/showimage/PatchMgmt.pdf>.*

* cited by examiner

FIG.2

SOFTWARE-PROPERTY MANAGEMENT LIST 200

| NETWORK ADDRESS | COMPUTER NAME | OS | USED APPLICATION |
|---|---|---|---|
| 211 | 221 | 231 | 2411<br>2412<br>: |
| 212 | 222 | 232 | 2421<br>2422<br>: |
| : | : | : | : |
| 21n | 22n | 23n | 24n1<br>24n2<br>: |

NETWORK-CONNECTED-COMPUTER LIST 100

| NETWORK ADDRESS | COMPUTER NAME |
|---|---|
| 111 | 121 |
| 112 | 122 |
| : | : |
| 11m | 12m |

COMPARISON

NETWORK-CONNECTED-COMPUTER LIST ~100

| MAC ADDRESS | IP ADDRESS | COMPUTER NAME |
|---|---|---|
| 00:00:4c:11:11:11 | 192.168.0.1 | host1 |
| 00:00:4c:22:22:22 | 192.168.0.4 | host2 |
| 00:00:4c:55:55:55 | 192.168.0.100 | host100 |
| 00:00:4c:77:77:77 | 192.168.1.50 | host50 |
| 00:00:4c:bb:bb:bb | 102.168.5.3 | host3 |

SOFTWARE-PROPERTY MANAGEMENT LIST ~200

| MAC ADDRESS | IP ADDRESS | COMPUTER NAME | OS | USED APPLICATION |
|---|---|---|---|---|
| 00:00:4c:55:55:55 | 192.168.0.100 | host100 | OS1 | App1, App2 |
| 00:00:4c:11:11:11 | 192.168.0.1 | host1 | OS1 | App1, App3, App4 |
| 00:00:4c:77:77:77 | 192.168.1.50 | host50 | OS2 | App1, App2, App3 |

OMISSION-IN-SOFTWARE-PROPERTY
-MANAGEMENT LIST           300

| MAC ADDRESS | IP ADDRESS | COMPUTER NAME |
|---|---|---|
| 00:00:4c:22:22:22 | 192.168.0.4 | host2 |
| 00:00:4c:bb:bb:bb | 102.168.5.3 | host3 |

FIG. 7

NETWORK-CONNECTED-COMPUTER LIST ~100

| MAC ADDRESS | IP ADDRESS | COMPUTER NAME |
|---|---|---|
| 00:00:4c:11:11:11 | 192.168.0.1 | host1 |
| 00:00:4c:22:22:22 | 192.168.0.4 | host2 |
| 00:00:4c:55:55:55 | 192.168.0.100 | host100 |
| 00:00:4c:77:77:77 | 192.168.1.50 | host50 |
| 00:00:4c:bb:bb:bb | 102.168.5.3 | host3 |

SOFTWARE-PROPERTY MANAGEMENT LIST ~200

| MAC ADDRESS | IP ADDRESS | COMPUTER NAME | OS | USED APPLICATION |
|---|---|---|---|---|
| 00:00:4c:55:55:55 | 192.168.0.100 | host100 | OS1 | App1, App2 |
| 00:00:4c:33:33:33 | 192.168.0.3 | host3 | OS1 | App1, App2, App4 |
| 00:00:4c:11:11:11 | 192.168.0.1 | host1 | OS1 | App1, App3, App4 |
| 00:00:4c:88:88:88 | 192.168.5.20 | host20 | OS2 | App1, App4 |
| 00:00:4c:77:77:77 | 102.168.1.50 | host50 | OS2 | App1, App2, App3 |

FIG.8

OMISSION-IN-SOFTWARE-PROPERTY-MANAGEMENT LIST 300

| MAC ADDRESS | IP ADDRESS | COMPUTER NAME |
|---|---|---|
| 00:00:4c:22:22:22 | 192.168.0.4 | host2 |
| 00:00:4c:bb:bb:bb | 102.168.5.3 | host3 |

UNUSED-COMPUTER LIST 400

| MAC ADDRESS | IP ADDRESS | COMPUTER NAME | OS | USED APPLICATION |
|---|---|---|---|---|
| 00:00:4c:33:33:33 | 192.168.0.3 | host3 | OS1 | App1, App2, App4 |
| 00:00:4c:88:88:88 | 192.168.5.20 | host20 | OS2 | App1, App4 |

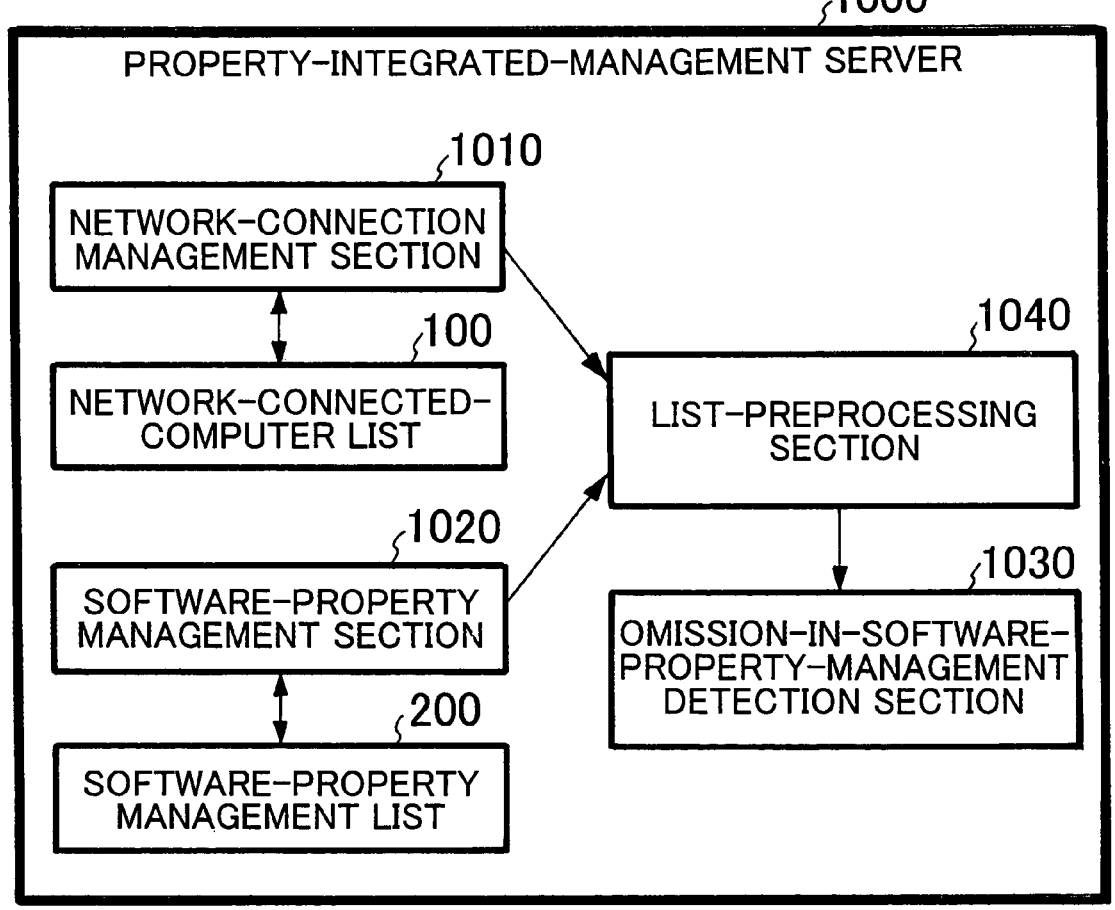

METHOD AND SYSTEM FOR DETECTING OMISSION IN SOFTWARE-PROPERTY MANAGEMENT USING NETWORK

BACKGROUND OF THE INVENTION

1. Field of the Invention

The present invention relates to a method of detecting omission in software-property management using a network, a system for the same, a server for the management, and a program for the management, which prevent a computer to be managed from being omitted in software-property management which manages, for each computer, basic information thereof and installed software, and fix-patch application status.

2. Description of the Related Art

Computers have recently been widely used in companies or organizations or the like for their businesses. Computers need to be used with software suitable for their intended purposes so that the companies or the like have installed and used various kinds of software on their computers.

Thus, the companies or the like need to take measures to properly manage the purchased software license to prevent the software from being illegally copied and used in their organization.

Most of software can, however, be easily installed from one medium to plural computers so that problems have arisen in that a huge amount of work is needed to know exactly whether pieces of software more than the licensed number are installed, and in that the survey results become much harder to maintain as the size of the organization increases.

In addition, many of the computers have recently been connected to networks to exchange information through them.

In such a situation, to prevent computer virus infection through E-mail or WEB access or the like, it is necessary to manage OS (Operating System) or application software installed on a computer connected to a network, not to have security concerns, such as by applying fix patches provided by software developers However, as with the software license management problem, a problem has arisen in that a huge amount of work is needed to know whether the OS or application software is properly updated.

Methods have been proposed to the above-described problems, including a method allowing automatic-centralized management of software-property information. This method can be done by running, on each computer connected to a network, client software for software-property management which collects information such as computer basic information (such as a host name, a network address) or list information on installed software, and by sending the collected information to a server for software-property management (see, for example, JP-A-2001-222424, JP-A-2001-290937, and JP-A-2002-279165). Other methods have also been proposed such as managing software-fix-patch application status using a dedicated server, and automatically downloading and applying a fix patch to a computer with no patches used yet (see, for example, JP-A-2000-250743 and JP-A-2002-55839).

There have been problems, however, with such conventional methods as described above, that is, it is supposed in the conventional methods that client software for software-property management or client software for downloading and applying a fix patch is installed and run on each computer, or that OS or application software has the equivalent function as such client software, so that a computer on which client software is not running may be omitted in software-property management information, and illegal use of software may be overlooked or a computer having security concerns may be overlooked.

SUMMARY OF THE INVENTION

The present invention was accomplished in light of the abovementioned circumstances and has an object to provide an omission-in-software-property-management detection method, system, server and program using a network for preventing a computer to be managed from being omitted in software-property management which manages, for each computer, basic information thereof, installed software, and fix-patch application status, for the purpose of allowing detection of a computer with unknown OS or application-patch application status and with a high possibility of having security concerns.

To achieve the abovementioned object, according to a first aspect of the present invention, there is provided a detection method of omission-in-software-property-management using a network for detecting a computer omitted from a software-property management which manages, for each computer, basic information thereof and installed software, and fix-patch application status, wherein a network-connected-computer list which holds, for all computers connected to a given network, information for identifying each computer, and a software-property management list which holds, for all computers to be managed by the software-property management, information for identifying each computer, are used as a basis on which a computer is extracted that is present in the network-connected-computer list and absent in the software-property management list, and there is created a list of computer omitted in the software-property management.

Such a method of an omission-in-software-property-management detection method using a network can create, in addition to a software-property management list, a list that includes every computer connected to a network, and use information such as a network address which can uniquely identify a computer, thereby finding out a computer omitted from software-property management.

Thus, a computer omitted from the software-property management can be easily determined.

Means for creating a list including every computer connected to a network can also be configured independently of the conventional software-property management system to detect a computer omitted from the software-property management.

And the conventional software-property management system can apply to this computer omitted from the software-property management.

Thus, omission can be prevented in the software-property management information without significant modification of the conventional software-property management system.

Consequently, in software-property management, which manages OS, software version, and patch-application status or the like at the same time, a list that includes every computer connected to a network can be used to prevent omission in management.

Thus, a computer with unknown OS, software version, or patch-application status or the like can be detected, and a computer with the non-latest patch-application status which may be a security hole can be prevented from being left connected to a network.

Furthermore, the network-connected-computer list and the software-property management list can be regularly updated and compared in an appropriate period, such as every day, to check that a computer newly connected to a network is under software-property management.

Thus, a computer out of the software-property management or an illegal computer can be detected early as an unmanaged computer, when it is connected to a network.

Note that the basic information means information such as a network address or computer name. Further, the basic information may only be a single piece of information for identifying each computer.

And the given network means a network such as an in-house LAN or VPN or the like, which is to be managed by companies, public offices, schools, or other organizations or individuals or the like.

According to a detection method of a second aspect of the present invention, in the detection method of the first aspect, the network-connected-computer list and the software-property management list are used as a basis on which a computer is extracted that is present in the software-property management list and absent in the network-connected-computer list, and there is created of a list of computer in unused state.

Such a method of an omission-in-software-property-management detection method using a network can create an unused-computer list to determine a computer that was previously used but is not used at present.

Further, creation of both the omission-in-software-property-management detection list and the unused-computer list can detect a computer omitted in software-property management and can obtain a list of software that is unused at present, thereby helping manage the software property more strictly.

According to a third aspect of the present invention, there is provided a detection system for omission-in-software-property-management using a network for detecting a computer omitted from a software-property management which manages, for each computer, basic information thereof and installed software, and fix-patch application status, comprising: a network-connection management server including a network-connected-computer list which holds, for all computers connected to a given network, information for identifying each computer; a software-property management server including a software-property management list which holds, for all computers to be managed by the software-property management, information for identifying each computer; and an omission-in-software-property-management detection server which uses the network-connected-computer list and the software-property management list as a basis to extract a computer that is present in the network-connected-computer list and absent in the software-property management list, and to create a list of computer omitted in the software-property management.

In such a configuration of an omission-in-software-property-management detection system using a network, a software-property management list managed by a software-property management server and a network-connected-computer list created by the network-connection management server can be used as a basis on which information such as a network address which can uniquely identify a computer can be used to easily find out a computer that is connected to a network, but is not under the software property management.

Consequently, a computer with unknown OS, software version, or patch-application status or the like can be detected, and a computer with the non-latest patch-application status which may be a security hole can be prevented from being left connected to a network.

Further, such a configuration of an omission-in-software-property-management detection system using a network can prevent omission of the managed object without significant modification of the conventional software-property management system.

In addition, a computer out of the software-property management or an illegal computer can be detected early as an unmanaged computer, when it is connected to a network.

According to a forth aspect of the present invention, in the detection system of the third aspect, the omission-in-software-property-management detection server uses the network-connected-computer list and the software-property management list as a basis to extract a computer that is present in the software-property management list and absent in the network-connected-computer list, and to create a list of computer in unused state.

Such a configuration of an omission-in-software-property-management detection system using a network can determine a computer that was previously used but is not used at present.

Thus, a computer omitted in software-property management can be detected, as well as a list of software that is unused at present can be obtained.

According to a fifth aspect of the present invention, there is provided a detection server for omission-in-software-property-management using a network for detecting a computer omitted from a software-property management which manages, for each computer, basic information thereof and installed software, and fix-patch application status, wherein a network-connected-computer list which holds, for all computers connected to a given network, information for identifying each computer, is received from a network-connection-management server including the network-connected-computer list, a software-property management list which holds, for all computers to be managed by the software-property management, information for identifying each computer, is received from a software-property management server including the software-property management list, and the network-connected-computer list and the software-property management list are used as a basis on which a computer is extracted that is present in the network-connected-computer list and absent in the software-property management list, and there is created a list of computer omitted in software-property management.

Such a configuration of an omission-in-software-property-management detection server using a network can use a network-connected-computer list from a network-connection management server and a software-property management list from a software-property management server as a basis to easily detect a computer omitted in the software-property management.

In addition, even if the software-property management server holds the conventional software-property management system, little modification needs to be made to this software-property management server.

Further, a computer that may be a security hole can be prevented from being left connected to a network, and a computer out of the software-property management or an illegal computer can be detected early when it is connected to a network.

According to a sixth aspect of the present invention, there is provided a detection server for omission-in-software-property-management using a network for detecting a computer omitted from a software-property management which manages, for each computer, basic information thereof and installed software, and fix-patch application status, comprising: a network-connection management section for creating a network-connected-computer list which holds, for all computers connected to a given network, information for identifying each computer; a software-property management section for creating a software-property management list which holds, for all computers to be managed by the software-property management, information for identifying each computer; and an omission-in-software-property-management detection section which uses the network-connected-computer list input from the network-connection management section and the software-property management list input from the software-property management section as a basis to extract a computer that is present in the network-connected-computer list and absent in the software-property management list, and to create a list of computer omitted in software-property management.

Such a configuration of an omission-in-software-property-management detection server using a network can allow one server to create the omission-in-software-property-management list.

Specifically, as an additional function to the conventional software-property management system, the above-described configuration can be added to the server included in the conventional software-property management system, thereby allowing the server to create an omission-in-software-property management list according to the present invention.

According to a seventh aspect of the present invention, in the detection server of the fifth aspect, the server uses the network-connected-computer list and the software-property management list as a basis to extract a computer that is present in the software-property management list and absent in the network-connected-computer list, and to create a list of computer in unused state.

According to a eighth aspect of the present invention, in the detection server of the sixth aspect, omission-in-software-property-management detection section uses the network-connected-computer list and the software-property management list as a basis to extract a computer that is present in the software-property management list and absent in the network-connected-computer list, and to create a list of computer in unused state.

Such a configuration of an omission-in-software-property-management detection server using a network can determine a computer that was previously used but is not used at present.

Specifically, a computer omitted in software-property management can be detected, as well as a list of software that is unused at present can be obtained.

According to a ninth aspect of the present invention, in the detection server of any of the fifth to eighth aspects, the server sorts the network-connected-computer list and the software-property management list, and uses these sorted network-connected-computer list and software-property management list as a basis to create the list of a computer omitted in software-property management or the list of computer in unused state.

Such a configuration of an omission-in-software-property-management detection server using a network can, for example, sort each of the network-connected-computer list and the software-property management list in ascending or descending order according to the network address or the like, and thereby creating the omission-in-software-property-management detection list by executing a process using a binary-search algorithm or the like instead of using a sequential-search algorithm Thus, the creation process of the omission-in-software-property-management list and the unused-computer list can be executed at a higher speed.

According to a tenth aspect of the present invention, there is provided a detection program for omission-in-software-property-management using a network for detecting a computer omitted from a software-property management which manages, for each computer, basic information thereof and installed software, and fix-patch application status, wherein an omission-in-software-property-management detection server is allowed to receive a network-connected-computer list which holds, for all computers connected to a given network, information for identifying each computer, from a network-connection-management server including the network-connected-computer list, receive a software-property management list which holds, for all computers to be managed by the software-property management, information for identifying each computer, from a software-property management server including the software-property management list, and use the network-connected-computer list and the software-property management list as a basis to extract a computer that is present in the network-connected-computer list and absent in the software-property management list, and to create a list of computer omitted in the software-property management.

Such a configuration of an omission-in-software-property-management detection program using a network can allow the omission-in-software-property-management detection server to use a network-connected-computer list from a network-connection management server and a software-property management list from a software-property management server as a basis to easily detect a computer omitted in software-property management.

Thus, in software-property management that manages OS, software version, and patch-application status or the like at the same time, a list including every computer connected to a network according to the present invention can be created to prevent the omission in management.

According to a eleventh aspect of the present invention, there is provided a detection program for omission-in-software-property-management using a network for detecting a computer omitted from a software-property management which manages, for each computer, basic information thereof and installed software, and fix-patch application status, wherein an omission-in-software-property-management detection server is allowed to create a network-connected-computer list which holds, for all computers connected to a given network, information for identifying each computer, create a software-property management list which holds, for all computers to be managed by the software-property management, information for identifying each computer, and use the network-connected-computer list and the software-property management list as a basis to extract a computer that is present in the network-connected-computer list and absent in the software-property management list, and to create a list of computer omitted in the software-property management.

Such a configuration of an omission-in-software-property-management detection program using a network can allow one server to create the omission-in-software-property-management list.

Thus, this can prevent omission in management in the software-property management that manages OS, software version, and patch-application status or the like at the same time.

According to a twelfth aspect of the present invention, in the detection program using of the tenth or eleventh aspects, an omission-in-software-property-management detection server is allowed to use the network-connected-computer list and the software-property management list as a basis to extract a computer that is present in the software-property management list and absent in the network-connected-computer list, and to create a list of computer in unused state.

Such a configuration of an omission-in-software-property-management detection program using a network can allow the omission-in-software-property-management detection server to determine a computer that was previously used but is not used at present.

This can also allow the omission-in-software-property-management detection server to output a list of software that is unused at present.

According to a thirteenth aspect of the present invention, in the detection program of any of the tenth to twelfth aspects, an omission-in-software-property-management detection server is allowed to sort the network-connected-computer list and the software-property management list, and use these sorted network-connected-computer list and software-property management list as a basis to create the list of a computer omitted in software-property management or the list of computer in unused state.

Such a configuration of an omission-in-software-property-management detection program using a network can allow the omission-in-software-property-management detection server to sort the network-connected-computer list and the software-property management list, and subsequently to create the omission-in-software-property-management detection list or the unused-computer list.

Thus, the creation process can be executed at a higher speed.

BRIEF DESCRIPTION OF THE DRAWINGS

In the accompanying drawings:

FIG. 2 shows a network-connected-computer list and a software-property-management list in the omission-in-software-property-management detection system using a network in the first embodiment of the present invention;

FIG. 4 shows concrete examples of a network-connected-computer list and a software-property management list in the omission-in-software-property-management detection system using a network in the first embodiment of the present invention.

FIG. 5 shows a concrete example of an omission-in-software-property-management list in the omission-in-software-property-management detection system using a network in the first embodiment of the present invention;

FIG. 7 shows concrete examples of a network-connected-computer list and a software-property management list in the omission-in-software-property-management detection system using a network in the second embodiment of the present invention;

FIG. 8 shows concrete examples of an omission-in-software-property-management detection list and an unused-computer list in the omission-in-software-property-management detection system using a network in the second embodiment of the present invention;

FIG. 10 shows a block diagram of a configuration of an omission-in-software-property-management detection server using a network in the fourth embodiment of the present invention.

DETAILED DESCRIPTION OF THE PREFERRED EMBODIMENTS

The present invention will now be described below referring to the accompanying drawings.

First Embodiment

Figure 1:
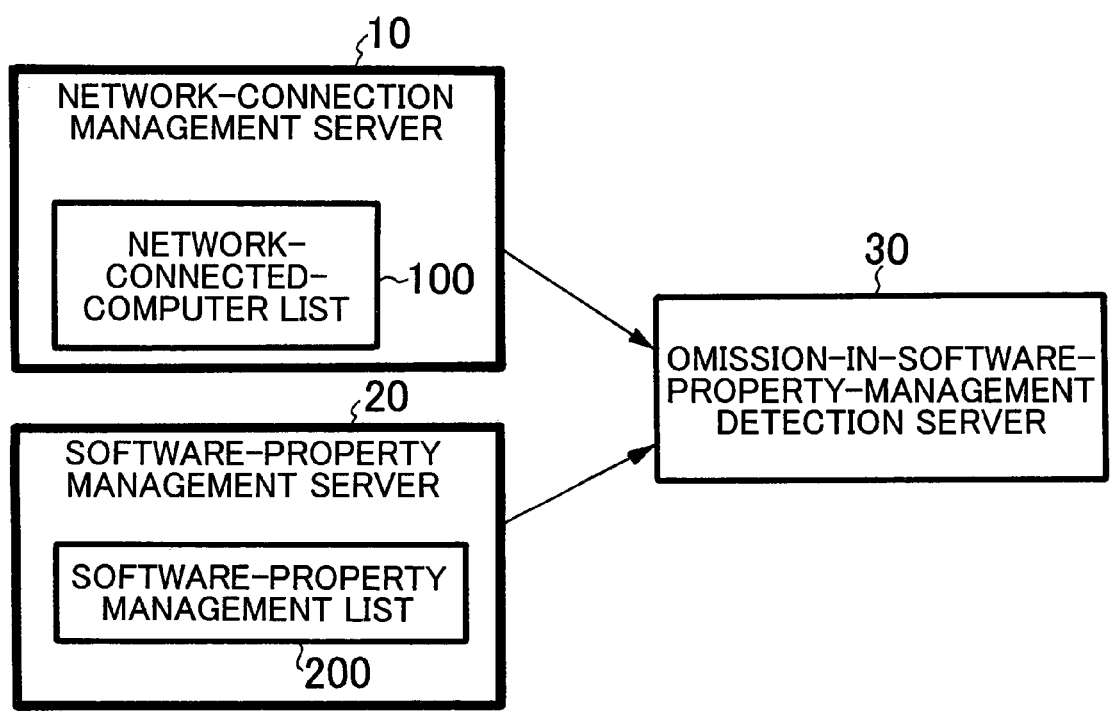
FIG. 1 shows a block diagram of a configuration of an omission-in-software-property-management detection system using a network in the first embodiment of the present invention.

A first embodiment of the present invention will first be described below referring to FIGS. 1 and 2. FIG. 1 shows a block diagram of a configuration of an omission-in-software-property-management detection system using a network in the first embodiment of the present invention. FIG. 2 shows a network-connected-computer list and a software-property-management list in the system.

As shown in FIG. 1, an omission-in-software-property-management detection system using a network comprises a network-connection management server 10, a software-property management server 20, and an omission-in-software-property-management detection server 30.

In this embodiment, these servers are connected using Ethernet (registered trademark) as a physical network, and TCP/IP (Transmission Control Protocol/Internet Protocol) as a network protocol, but the present invention is not limited to them.

The network-connection management server 10 is a server for managing a computer connected to a network and holds a network-connected-computer list 100.

This network-connected-computer list 100 may be created using any means that can list every computer connected to a network.

For example, when Ethernet (registered trademark) is used as a physical network and TCP/IP is used as a network protocol, a computer can be connected to a network for communication using a mechanism that broadcasts an ARP (Address Resolution Protocol) to identify a MAC (Media Access Control) address of the connected computer.

Specifically, a packet-monitoring device is provided in each broadcast domain to monitor the ARP packet, and the MAC address and the IP address included in the ARP packet are used to detect and list the computer.

Then, a means can be used that asks DNS (Domain Name System) with the detected IP address to identify a computer name and creates the network-connected-computer list 100 which includes every computer connected to a network.

The software-property management server 20 is a server for managing use status of software property purchased and used in the organization and holds a software-property management list 200.

This software-property management list 200 may be created using any means that can list software-property management information such as a kind and name of an OS (Operating System) and application installed in each computer, and fix-patch application status, and computer basic information such as a MAC address, an IP address, and a computer name.

For example, agent software is run on each computer that surveys software-property management information and computer basic information, and the survey results are sent to the software-property management server 20.

A means can then be used that allows the software-property management server 20 to create the software-property management list 200 based on the information sent from each computer.

The omission-in-software-property-management detection server 30 receives the network-connected-computer list 100 from the network-connection management server 10 and also receives the software-property management list 200 from the software-property management server 20.

The omission-in-software-property-management detection server 30 also compares the network-connected-computer list 100 and the software-property management list 200 using as a key the MAC address used to identify a computer in communication over the Ethernet (registered trademark) and determines a computer omitted in the software-property-management list 200.

This determination of the omitted computer will be described below with reference to FIG. 2. In FIG. 2, the network-connected-computer list 100 is created using a means for detecting every computer connected to a network, and has network addresses 11l to 11m and corresponding computer names 121 to 12m.

The software-property management information list 200 organizes and classifies computer basic information, installed OS, application software or the like, for each computer. A network address and a computer name are registered here as the computer basic information.

The omitted computer is determined by comparing the network addresses 11l to 11m in the network-connected-computer list 100 and the network addresses 21l to 21n in the software-property management information list 200 and by deciding that a computer with an address included in 11l to 11m but not in 21l to 21n is a computer omitted from the software-property management information. This method helps prevent omission in management of software property used in computers connected to a network and also helps prevent a situation with security concerns where a computer with unknown OS or application-patch application status is left connected to a network.

Figure 3:
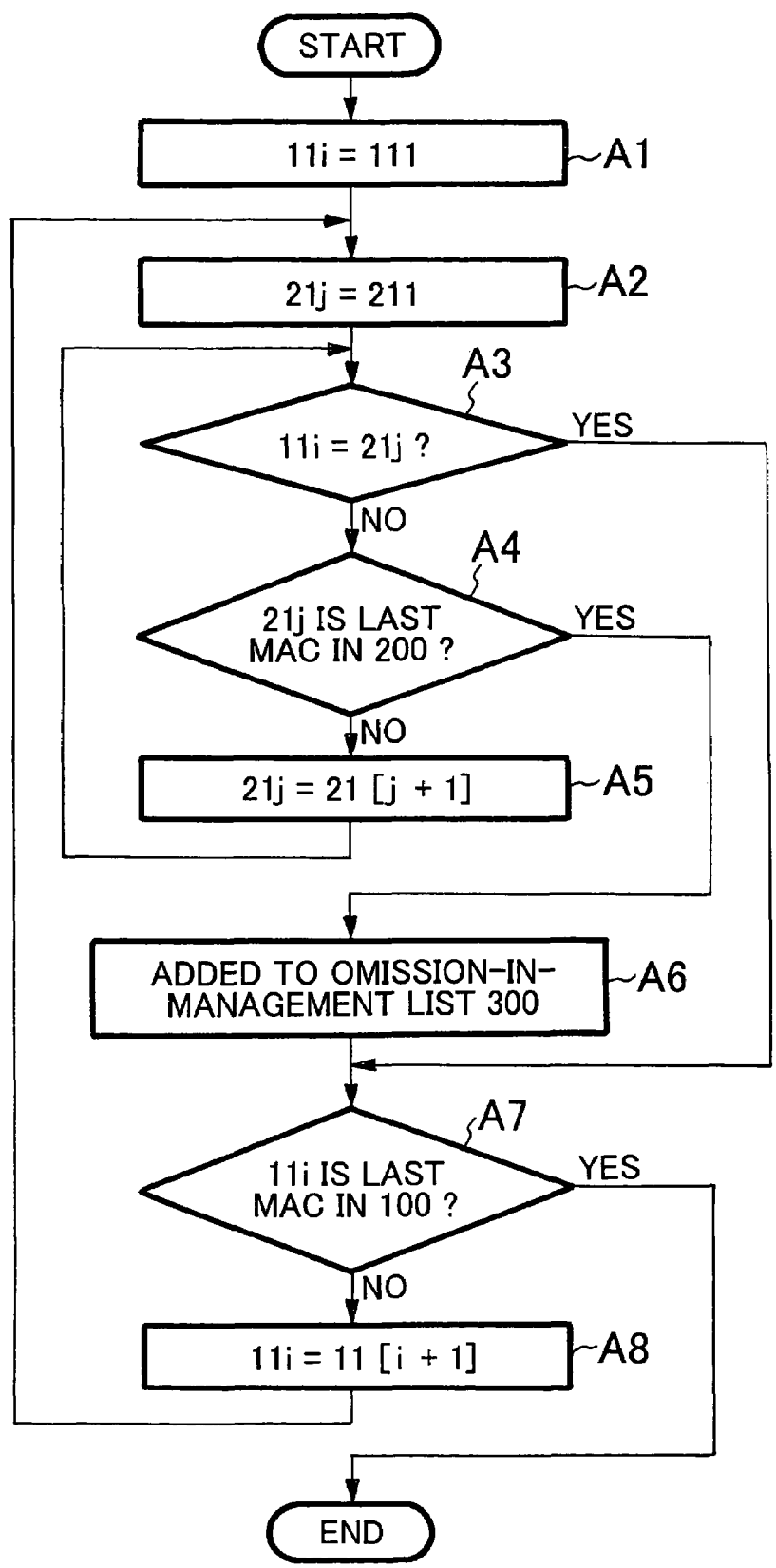
FIG. 3 shows a flowchart of a processing procedure in the omission-in-software-property-management detection system using a network in the first embodiment of the present invention.

Referring now to FIG. 3, a processing procedure in the omission-in-software-property-management detection server 30 using a network in this embodiment will be described below. FIG. 3 shows a flowchart of a processing procedure in the omission-in-software-property-management detection system using a network in this embodiment.

First, before the processing in the flowchart, the omission-in-software-property-management detection server 30 receives the network-connected-computer list 100 from the network-connection management server 10 and also receives the software-property management list 200 from the software-property management server 20.

Then, the omission-in-software-property-management detection server 30 will determine a computer omitted from the software-property management information based on these lists, as described below. Note that the omission-in-software-property-management detection server 30 will be omitted in the description below, although it is the subject of the operations in the flowchart in FIG. 3.

First, the computer MAC address information described at the head of the network-connected-computer list 100 is read out (step A1). Operations in subsequent steps A2 to A6 show operations that decide whether the software-property management list 200 includes the computer with this read out MAC address 11i, and if not, add the computer to the computer-omitted-in-software-property-management list 300.

Specifically, the computer MAC address information described at the head of the software-property management list 200 is read out (step A2).

Then, the MAC address read out in the step A1 and the MAC address read out in the step A2 are compared (step A3). If both addresses are the same, it is decided that the software-property management list 200 includes a computer corresponding to the MAC address 11i readout from the network-connected-computer list 100, and then proceeding to step A7.

If the MAC addresses are different, it is decided whether the MAC address 21j read out from the software-property management list 200 of the MAC addresses used in the comparison at step A3 is the MAC address of the last computer in the software-property management list 200 (step A4).

If the MAC address 21j is not the MAC address of the last computer in the list, the MAC address of the next computer in the list 200 is read out (step A5), and the processes from step A3 are executed again.

If the MAC address 21j is the MAC address of the last computer in the property management list 200, it is decided that the software-property management list 200 does not include a computer corresponding to the MAC address 11i read out from the network-connected-computer list 100, and then proceeding to step A6.

Here, information on a computer with the MAC address 11i is read out from the network-connected-computer list 100 and is added to the computer-omitted-in-software-property-management list 300 (step A6), and then proceeding to step A7.

There it is decided whether the MAC address 11i is the MAC address of the last computer in the network-connected-computer list 100 (step A7). If the MAC address 11I is not the MAC address of the last computer in the list 100, the MAC address of the next computer in the list is read out (step A8) and the processes at steps A2 to A6 are repeated.

If the MAC address 11i is the MAC address of the last computer in the list 100, the process is ended because it has been decided for every computer included in this network-connected-computer list 100 whether the software-property management 200 includes the computer.

Referring now to FIGS. 4 and 5, a processing procedure in the omission-in-software-property-management detection system using a network in this embodiment will be described below with reference to concrete examples.

FIG. 4 shows concrete examples of a network-connected-computer list and a software-property management list in the omission-in-software-property-management detection system using a network in this embodiment. FIG. 5 shows a concrete example of a list of computer omitted in software-property management in the system, more specifically an omission-in-software-property-management detection list.

The above-described processing procedure shown in FIG. 3. executed using the network-connected-computer list 100 and the software-property management 200 shown in FIG. 4 will be specifically described below.

First, at step Al, the MAC address "00: 00: 4c: 11: 11: 11" at the head of the network-connected-computer list 100 is read out.

Then, at step A2, the MAC address "00: 00: 4c: 55: 55: 55" at the head of the software-property management list 200 is read out.

Next, at step A3, the read out addresses are compared. The MAC addresses read out from each list are different in this case, and then proceeding to step A4.

At step A4, it is decided whether the MAC address read out from the software-property management list 200 is the last one. In this case, the address is not the last one, and then proceeding to step A5, where the next MAC address in the list, "00: 00: 4c: 11: 11: 11" is read out, and then returning to step A3.

At the next step A3, the MAC addresses are compared and are the same, and then proceeding to step A7.

At step A7, it is decided whether the MAC address read out from the network-connected-computer list is the last one in the list 100. The address is not the last one in the list 100 in this case, and then proceeding to step A8, where the next MAC address in the list 100, "00: 00: 4c: 22: 22: 22" is read out, and then returning to step A2.

Further operations are the same as in the case where the MAC address read out from the network-connected-computer list 100 is "00: 00: 4c: 11: 11: 11."

A computer with the address "00: 00: 4c: 22: 22: 22" is not, however, registered in the software-property management list 200.

Thus, when the MAC address "00: 00: 4c: 77: 77: 77" of the last computer in the software-property management list 200 is processed, the processing proceeds from step A4 to step A6, where, information on the computer with the MAX address "00: 00: 4c: 22: 22: 22" is added to the omission-in-software-property-management list 300.

Similarly, such of the computers registered in the network-connected-computer list as have the MAC addresses "00: 00: 4c: 55: 55: 55" and ""00: 00: 4c: 77:77:77" are also registered in the software-property management list 200.

Thus, the operations for these computers are the same as for the computer with the MAC address "00: 00: 4c: 11: 11: 11."

In addition, a computer with the MAC address "00: 00: 4c: bb: bb: bb" is not registered in the software-property management 200. Thus, the operations for this computer is the same as for the computer with the MAC address "00: 00: 4c: 22: 22: 22."

This computer with the MAC address "00: 00: 4c: bb: bb: bb", however, corresponds to the last MAC address in the network-connected-computer list 100. Thus, the processing ends after the process at step A7.

The processing described above can create the omission-in-software-property-management list 300 shown in FIG. 5.

As described above, the omission-in-software-property-management detection system using a network in this embodiment can easily determine a computer omitted from the software-property management.

In addition, omission can be prevented in the software-property management information without significant modification of the conventional software-property management system.

Consequently, a computer with unknown OS, software version, or patch-application status or the like can be detected, and a computer that does not have the latest patch-application status and may be a security hole can be prevented from being left connected to a network.

Furthermore, the network-connected-computer list and the software-property management list can be regularly updated and compared in an appropriate period to detect early a computer out of the software-property management or an illegal computer, when it is connected to a network.

Second Embodiment

Figure 6:
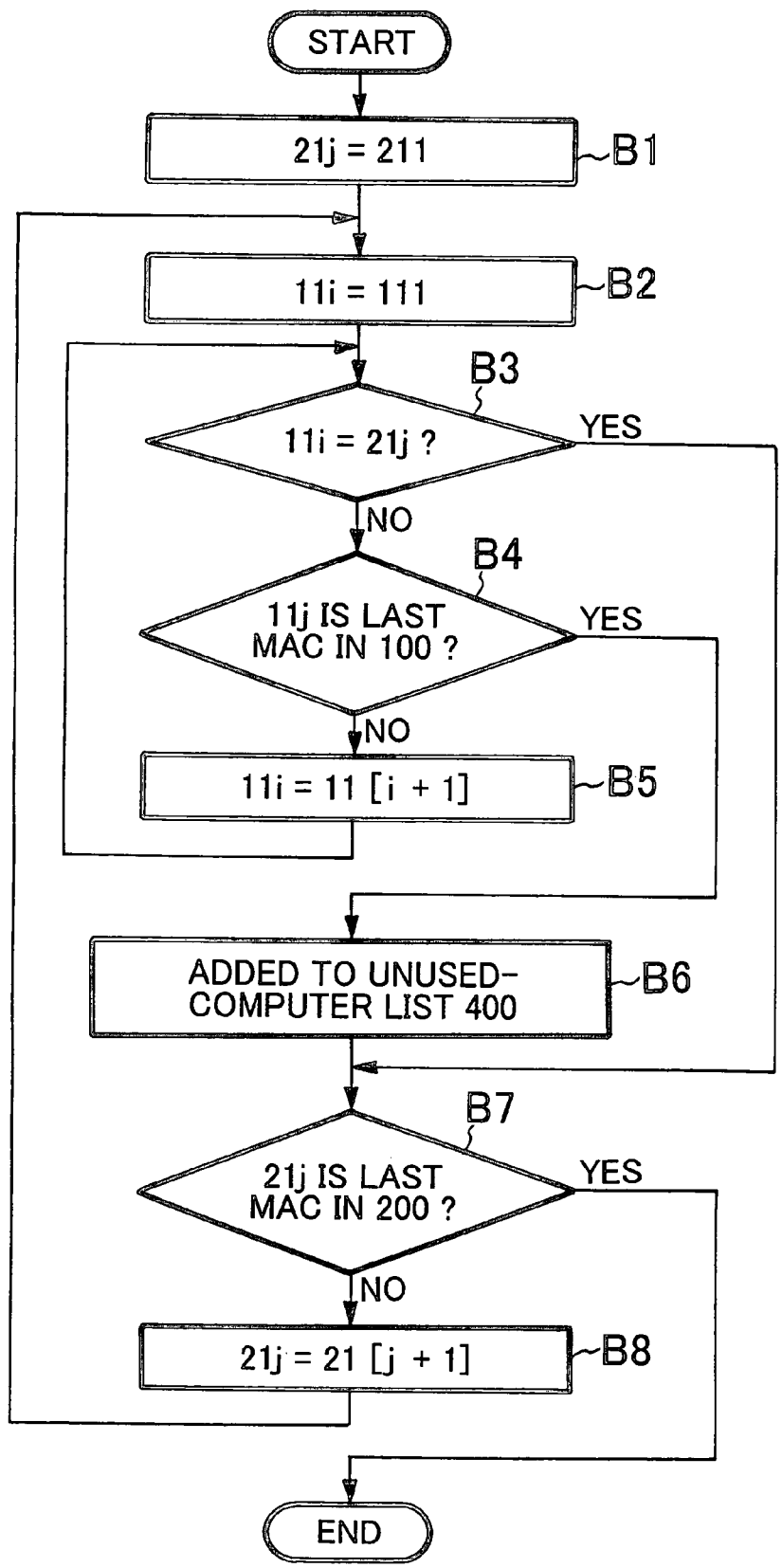
FIG. 6 shows a flowchart of a processing procedure in the omission-in-software-property-management detection system using a network in the second embodiment of the present invention.

A second embodiment of the present invention will now be described below referring to FIGS. 3, and 6 to 8. FIG. 6 shows a flowchart of a processing procedure in the omission-in-software-property-management detection system using a network in this embodiment. FIG. 7 shows concrete examples of a network-connected-computer list and a software-property management list in the system. FIG. 8 shows concrete examples of an omission-in-software-property-management detection list, and a list of computer that is in unused state, more specifically, an unused-computer list.

This embodiment differs from the first embodiment in that a computer can be determined that was previously used but is not used at present.

The operation procedure in the flowchart in FIG. 6 is obtained from a reverse relationship between the network-connected-computer list 100 and the software-property management list 200 in the flowchart in FIG. 3.

The flowchart in FIG. 6 can detect a computer that is included in the software-property management list but not included in the network-connected-computer list and can decide that it is a computer that is already unused.

Further, the omission-in-software-property-management detection server 30 can execute the flowchart processing in FIG. 6 after completing the flowchart processing in FIG. 3 to create both the computer-omitted-in-software-property-management list 300 and the unused-computer list 400.

That is, a computer omitted in software-property management can be detected as well as a list of software that is unused at present can be obtained, so that the software property can be easily managed more strictly.

The operations in a continuous processing of the flowchart in FIG. 3 and the flowchart in FIG. 6 using the network-connected-computer list 100 and the software-property management list 200 shown in FIG. 7 will now be specifically described below.

The lists in FIG. 7 are obtained from the lists in FIG. 4 by adding information on two computers not included in the network-connected-computer list 100 to the software-property management list 200. The network-connected-computer list 100 in FIG. 7 is the same as that in FIG. 4.

In other words, the computers in the lists in FIG. 7 that are included in the network-connected-computer list 100 and not included in the software-property management list 200 are the same as those in the lists in FIG. 4.

Therefore, the same computers are added to the computer-omitted-in-software-property-management list 300 when the lists in FIG. 7 are used as those added when the lists in FIG. 4 are used. Thus, the detailed description will be omitted of the processing operations for creating the omission-in-software-property-management list 300 according to the flowchart in FIG. 3.

Next, the flowchart processing in FIG. 6, which is executed after the flowchart processing in FIG. 3, will be described below.

First, the MAC address "00: 00: 4c: 55: 55: 55" at the head of the software-property management list 200 is read out (step B1). Then, the MAC address "00: 00: 4c: 11: 11: 11" at the head of the network-connected-computer list 100 is read out (step B2).

Next, the read out MAC addresses are compared (step B3). The MAC addresses read out from each list are different in this case, and then proceeding to step B4.

There, it is decided whether the MAC address read from the network-connected-computer list 100 is the last one in the list 100 (step B4). The address is not the last one in the list in this case, and then the next MAC address in the list, "00: 00: 4c: 22: 22: 22" is read out (step B5), and then returning to step B3.

At the next step B3, the MAC addresses are compared and are also different, and then the processing proceeds in order of step B4 and step B5, where the next MAC address in the network-connected-computer list 100, "00: 00: 4c: 55: 55: 55" is read out, and then returning to step B3.

At the next step B3, the MAC addresses are compared and are the same, and then proceeding to step B7.

There, it is decided whether the MAC address read out from the software-property management list 200 is the last one in the list 200 (step B7). The address is not the last one in the list 200 in this case, and then proceeding to step B8.

There, the next MAC address in the list, "00: 00: 4c: 33: 33: 33" is read out (step B8), and then returning to B2.

Further operations are the same as in the case where the MAC address read out from the software-property management 200 is "00: 00: 4c: 55: 55: 55." A computer with the address "00: 00: 4c: 33: 33: 33" is not, however, registered in the network-connected-computer list 100.

Thus, when the MAC address read out from the network-connected-computer list 100 is "00: 00: 4c: bb: bb: bb", it is decided at the step B4 that this address is the last MAC address in the network-connected-computer list 100, and then proceeding to step B6, where information on a computer with the MAC address "00: 00: 4c: 33: 33: 33" is added to the unused-computer list 400 (step B6).

Such of the computers registered in the software-property management list 200 as have the MAC addresses "00: 00: 4c: 11: 11: 11", "00: 00: 4c: 77: 77: 77" are also registered in the network-connected-computer list 100. Thus, the operations for these computers are the same as for the computer with the MAC address "00: 00: 4c: 55: 55: 55."

In addition, a computer with the MAC address "00: 00: 00: 4c: 88: 88: 88" is not registered in the network-connected-computer list 100. Thus, the operations for this computer is the same as for the computer with the MAC address "00: 00: 00: 4c: 33: 33: 33."

Furthermore, the computer with the MAC address in the list 200 of "00: 00: 4c: 77: 77: 77" corresponds to the last MAC address in the software-property management list 200. Thus, the processing ends after the process at step B7.

FIG. 8 shows the omission-in-software-property-management list 300 and the unused-computer list 400 thus created.

As described above, the omission-in-software-property-management detection system using a network in this embodiment can create the omission-in-software-property-management list as well as the unused-computer list, so that a computer that is already unused can be determined.

That is, a computer omitted from the software-property management can be detected as well as a list of software that is unused at present can be obtained, so that the software property can be easily managed more strictly.

Third Embodiment

Figure 9:
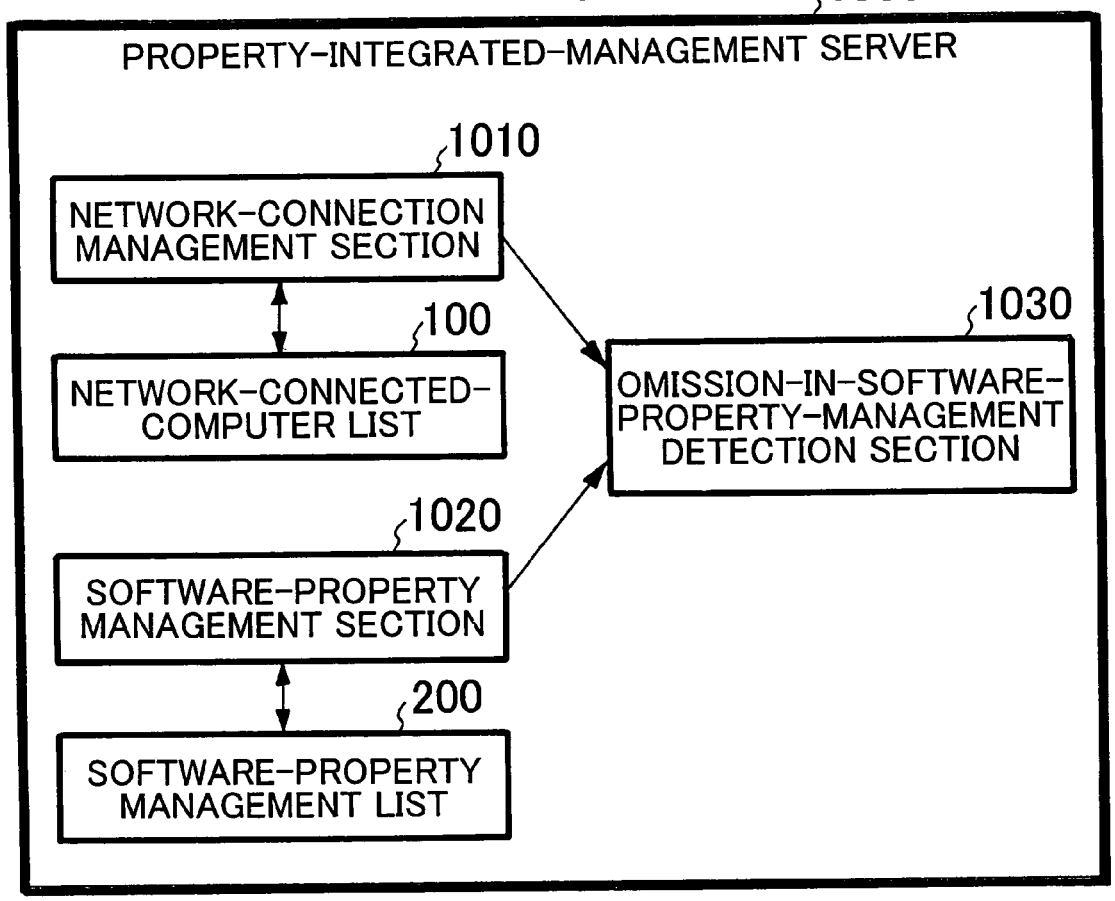
FIG. 9 shows a block diagram of a configuration of an omission-in-software-property-management detection server using a network in the third embodiment of the present invention.

A third embodiment of the present invention will now be described below referring to FIG. 9. FIG. 9 shows a block diagram of a configuration of an omission-in-software-property-management detection server using a network in this embodiment.

This embodiment differs from the first and second embodiments in that one server can create the omission-in-software-property-management list 300 and the unused-computer list 400.

Specifically, as shown in FIG. 9, a property-integrated-management server 1000 integrates into one server the configuration comprising three separate servers, the network-connection management server 10, the software-property management server 20, and the omission-in-software-property-management detection server 30 in FIG. 1.

In FIG. 9, a network-connection management section 1010 realizes the function of the network-connection management server 10 in FIG. 1, the software-property management section 1020 realizes the function of the software-property management server 20, and the omission-in-software-property-management detection section 1030 realizes the function of the omission-in-software-property-management detection server 30.

Thus, the present invention can be practiced with a server provided for each function, or with each function realized by one server.

Fourth Embodiment

A fourth embodiment of the present invention will now be described below referring to FIG. 10. FIG. 10 shows a block diagram of a configuration of an omission-in-software-property-management detection server using a network in this embodiment.

This embodiment differs from the third embodiment in that the omission-in-software-property-management list 300 or the unused-computer list 400 is created with each of the network-connected-computer list 100 and the software-property management list 200 used after being sorted.

Specifically, as shown in FIG. 10, the property-integrated-management server 1000 comprises a list-preprocessing section 1040 added to the configuration in the third embodiment.

This list-preprocessing section 1040 sorts each of the network-connected-computer list 100 and the software-property management list 200 in ascending or descending order according to the MAC address. Thus, the omission-in-software-property-management detection section 1030 can execute, for example, a process using a binary-search algorithm, instead of a process using a sequential-search algorithm.

Consequently, the creation process can be executed at a higher speed of the omission-in-software-property-management list 300 and the unused-computer list 400.

As described above, the present invention can be practiced with any algorithm that can execute a list-comparison process using as a key the network address in FIG. 1.

It should be understood that such a list preprocessing could also be executed in the first embodiment or in the second embodiment.

In this case, the list preprocessing can be executed on the network-connected-computer list 100 in the network-connection management server 10 and can also be executed on the software-property management list 200 in the software-property management server 20.

The list preprocessing can also be executed on both the network-connected-computer list 100 and the software-property management list 200 in the omission-in-software-property-management detection server 30.

An omission-in-software-property-management detection program using a network can execute the detection of the omission in the software-property management and the creation of the omission-in-software-property-management detection list or the like in the above embodiment.

This omission-in-software-property-management detection program using a network sends a command to each component in the computer to allow the components to execute predetermined processes such as the detection process of the omission in the software-property management and the creation process of the omission-in-software-property-management detection list, or the like.

Thus, these processes are realized such as by the omission-in-software-property-management detection server 30 using a network in which the omission-in-software-property-management detection program using a network and the computer cooperate.

Furthermore, the omission-in-software-property-management detection program using a network can be stored in a ROM or hard disk in the computer, as well as a computer-readable storage medium such as an external memory device and a portable storage medium.

The external memory device refers to an expanded-memory device, which contains a storage medium such as a magnetic disk and externally connects to the omission-in-software-property-management detection server 30 using a network or the like. On the other hand, the portable storage medium refers to a storage medium that can be mounted on a storage-medium driving device (drive device) and is portable, including a CD-ROM, flexible disk, memory card, and magnetic optical disk or the like.

The program stored on the storage medium is then loaded into a RAM and executed by the CPU. This execution can realize the means of the omission-in-software-property-management detection server 30 using a network in this embodiment described above.

In addition, the computer can load the omission-in-software-property-management detection program using a network by downloading into its own RAM or external memory device via a communication line the omission-in-software-property-management detection program using a network held by another computer.

This downloaded omission-in-software-property-management detection program using a network is also executed by the CPU and can realize processes such as the detection process of the omission in the software-property management and the creation process of the omission-in-software-property-management detection list in this embodiment.

Note that the present invention is not limited to the embodiments described herein and various modifications can be made within the scope of the invention.

Appropriate design changes can be made, for example, the network-connected-computer list 100 and the software-property-management list 200 can be compared using as a key a network address other than the MAC address or other key that can uniquely identify the computer.

What is claimed is:

1. A detection method of omission-in-software-property-management using a network for detecting a computer omitted from a software-property management which manages, for each computer, basic information thereof and installed software, and fix-patch application status, the method comprising the steps of:
    performing a first step wherein a network-connected-computer list which holds, for all computers connected to a given network, information for identifying each computer, and a software-property management list which holds, for all computers to be managed by said software-property management, information for identifying each computer, are used as a basis on which a computer is extracted that is present in said network-connected-computer list and absent in said software-property management list; and
    performing a second step wherein there is created a list of computer omitted in the software-property management based on the computer extracted that is present in said network-connected-computer list and absent in said software-property management list in the first step,
    wherein in the first step, said network-connected-computer list and said software-property management list are used as a basis on which a computer is extracted that is present in said software-property management list and absent in said network-connected-computer list, and
    in the second step, there is created a list of computer in unused state based on the computer extracted that is present in said software-property management list and absent in said network-connected-computer list.

2. The detection method according to claim 1, wherein the network-connected-computer list is compared with the software-property management list as the basis on which the computer is extracted.

3. The detection method according to claim 2, wherein the difference between the network-connected-computer list and the software-property management list is extracted.

4. The detection method according to claim 1, wherein the computer omitted in software-property management is a computer connected to the network not under software-property management.

5. The detection method according to claim 4, wherein the computer not under software-property management includes a computer operating with an unknown operating system, software version, or patch-application status.

6. The detection method according to claim 1, wherein the list of computer omitted in the software-property management includes information of the computer extracted.

7. The detection method according to claim 1, wherein the list of computer in unused state indicates a list of unused software.

8. A detection system for omission-in-software-property-management using a network for detecting a computer omitted from a software-property management which manages, for each computer, basic information thereof and installed software, and fix-patch application status, comprising:
    a central processing unit (CPU);
    a network-connection management server including a network-connected-computer list which holds, for all computers connected to a given network, information for identifying each computer;
    a software-property management server including a software-property management list which holds, for all computers to be managed by said software-property management, information for identifying each computer; and
    an omission-in-software-property-management detection server which uses said network-connected-computer list and said software-property management list as a basis to extract a computer that is present in said network-connected-computer list and absent in said software-property management list, and to create a list of computer omitted in the software-property management based on the computer extracted that is present in said network-connected-computer list and absent in said software-property management list,
    wherein said omission-in-software-property-management detection server uses said network-connected-computer list and said software-property management list as a basis to extract a computer that is present in said software-property management list and absent in said network-connected-computer list, and to create a list of computer in unused state based on the computer extracted that is present in said software-property management list and absent in said network-connected-computer list.

9. The detection server for omission-in-software-property-management using a network for detecting a computer omitted from a software-property management which manages, for each computer, basic information thereof and installed software, and fix-patch application status, comprising:
    a central processing unit (CPU);
    a network-connected-computer list which holds, for all computers connected to a given network, information for identifying each computer, is received from a network-connection-management server including said network-connected-computer list,
a software-property management list which holds, for all computers to be managed by said software-property management, information for identifying each computer, is received from a software-property management server including said software-property management list, and
said network-connected-computer list and said software-property management list are used as a basis on which a computer is extracted that is present in said network-connected-computer list and absent in said software-property management list, and there is created a list of computer omitted in the software-property management based on the computer extracted that is present in said network-connected-computer list and absent in said software-property management list,
wherein said detection server uses said network-connected-computer list and said software-property management list as a basis to extract a computer that is present in said software-property management list and absent in said network-connected-computer list, and to create a list of computer in unused state based on the computer extracted that is present in said software-property management list and absent in said network-connected-computer list.

10. A detection server for omission-in-software-property-management using a network for detecting a computer omitted from a software-property management which manages, for each computer, basic information thereof and installed software, and fix-patch application status, comprising:
a central processing unit (CPU);
a network-connection management section for creating a network-connected-computer list which holds, for all computers connected to a given network, information for identifying each computer;
a software-property management section for creating a software-property management list which holds, for all computers to be managed by said software-property management, information for identifying each computer; and
an omission-in-software-property-management detection section which uses said network-connected-computer list input from said network-connection management section and said software-property management list input from said software-property management section as a basis to extract a computer that is present in said network-connected-computer list and absent in said software-property management list, and to create a list of computer omitted in software-property management,
wherein said omission-in-software-property-management detection section uses said network-connected-computer list and said software-property management list as a basis to extract a computer that is present in said software-property management list and absent in said network-connected-computer list, and to create a list of computer in unused state.

11. The detection server according to any of claims 9 or 10, wherein
said server sorts said network-connected-computer list and said software-property management list, and uses these sorted network-connected-computer list and software-property management list as a basis to create said list of a computer omitted in software-property management and said list of computer in unused state.

12. A detection program, embedded in a computer-readable storage medium, for omission-in-software-property-management using a network for detecting a computer omitted from a software-property management which manages, for each computer, basic information thereof and installed software, and fix-patch application status, comprising:
an omission-in-software-property-management detection server is allowed to receive a network-connected-computer list which holds, for all computers connected to a given network, information for identifying each computer, from a network-connection-management server including said network-connected-computer list,
receive a software-property management list which holds, for all computers to be managed by said software-property management, information for identifying each computer, from a software-property management server including said software-property management list, and
use said network-connected-computer list and said software-property management list as a basis to extract a computer that is present in said network-connected-computer list and absent in said software-property management list, and to create a list of computer omitted in the software-property management based on the computer extracted that is present in said network-connected-computer list and absent in said software-property management list,
wherein said omission-in-software-property-management detection server is allowed to use said network-connected-computer list and said software-property management list as a basis to extract a computer that is present in said software-property management list and absent in said network-connected-computer list, and to create a list of computer in unused state based on the computer extracted that is present in said software-property management list and absent in said network-connected-computer list.

13. A detection program, embedded in a computer-readable storage medium, for omission-in-software-property-management using a network for detecting a computer omitted from software-property management which manages, for each computer, basic information thereof and installed software, and fix-patch application status, comprising:
an omission-in-software-property-management detection server is allowed to
create a network-connected-computer list which holds, for all computers connected to a given network, information for identifying each computer,
create a software-property management list which holds, for all computers to be managed by said software-property management, information for identifying each computer, and
use said network-connected-computer list and said software-property management list as a basis to extract a computer that is present in said network-connected-computer list and absent in said software-property management list, and to create a list of computer omitted in the software-property management based on the computer extracted that is present in said network-connected-computer list and absent in said software-property management list,
wherein said omission-in-software-property-management detection server is allowed to use said network-connected-computer list and said software-property management list as a basis to extract a computer that is present in said software-property management list and absent in said network-connected-computer list, and to create a list of computer in unused state based on the computer extracted that is present in said software-property management list and absent in said network-connected-computer list.

14. The detection program according to claim 12 or 13, wherein said omission-in-software-property-management detection server is allowed to sort said network-connected-computer list and said software-property management list, and to use these sorted network-connected-computer list and software-property management list as a basis to create said list of a computer omitted in software-property management or said list of computer in unused state.

\* \* \* \* \*